April 21, 1959
W. C. STRATMAN ET AL
2,882,762
AIRFEED DRILL NOSE ADAPTER
Filed Sept. 4, 1956
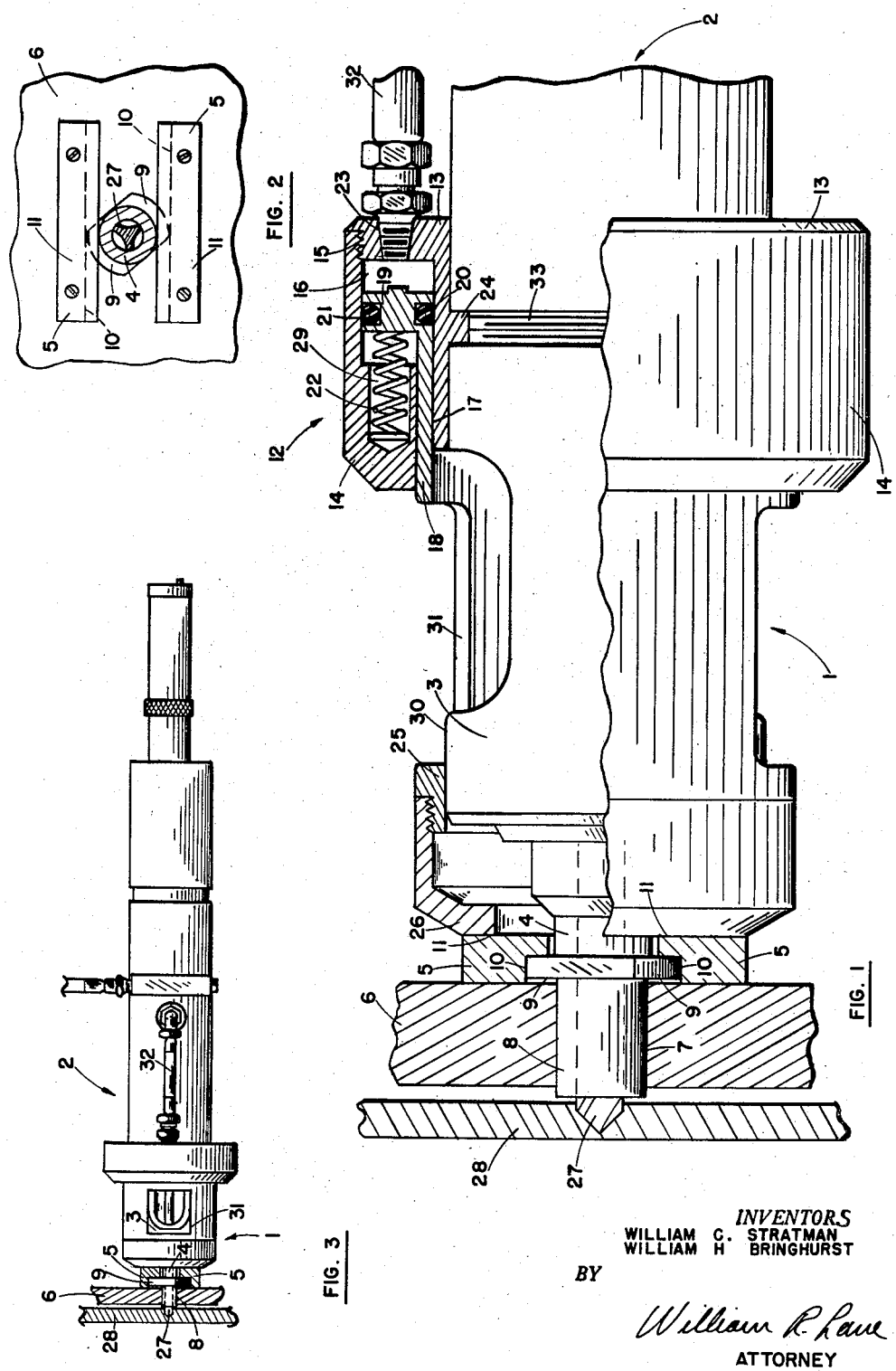
INVENTORS
WILLIAM C. STRATMAN
WILLIAM H. BRINGHURST
BY
*William R. Lane*
ATTORNEY

United States Patent Office 2,882,762
Patented Apr. 21, 1959

2,882,762

AIRFEED DRILL NOSE ADAPTER

William C. Stratman, Los Angeles, and William H. Bringhurst, Miracle Hot Springs, Calif., assignors to North American Aviation, Inc.

Application September 4, 1956, Serial No. 607,760

9 Claims. (Cl. 77—55)

This invention relates to a drilling unit for use with jig fixtures, templates and the like, and it has to do particularly with a nose adapter attachment for use with a portable self-holding drill.

It is common in the aircraft industry to use large drilling templates or jig fixtures, having a suitable predetermined drilling pattern apertured therein, with hand-operated air-feed drills of the well known Keller type. Due to the various indeterminate human factors involved, when such a drill is manually held and visually aligned by the operator, angular displacement of the tool frequently occurs with resultant canted holes and uneven countersinks. To alleviate this condition and to make the drill self-holding, a pair of parallel lock strips or machine screws having a reduced diameter head portion forming a shoulder were then placed a spaced distance apart opposite each other, one on each side of the template guide aperture, on one face of the template plate. The strips have downwardly facing notches along the nearest adjacent under-edges of the strips to form grooves. For coaction with these lock strips the drill was then provided with a drill guide having a bushing to be inserted into the template guide aperture and a pair of oppositely disposed locking flanges or tabs for positioning within the locking strip grooves. With the tabs lying parallel to the lock strips, the tabs could be inserted between the lock strips and then by rotating the drill and attached guide the tabs would be moved into the lock strip grooves to position and support the drill independent of any other means of support. This type of self-holding device eliminated errors in alignment due to drill angularity formerly attributable to the human factor when the drill was manually held by an operator; but as wear developed in any one of the template guide holes (or guide hole bushings, if used), the drill bushing, the notched-out edges of the lock strips, or on the locking flanges, a progressive angular displacement from the desired axis would gradually take place of all boreholes and countersinks as the drill unit would assume a drooping attitude due to its unsupported weight. This wear tendency causes a considerable maintenance problem in regard to lock strips, nose bushings and drill-hole bushings with the increasingly closer tolerance requirements presently in use in the aircraft industry. Such canted holes are particularly objectionable in materials forming portions of liquid containers, such as fuel cells and the like, where it is necessary to use sealed fasteners and where proper seating of the heads of fasteners is necessary for obtaining flush installations.

To overcome the above stated objections, this invention provides a pressure operated piston and cylinder mechanism wherein the cylinder portion is attached to the drill body and when the piston is extended to forcibly bear against the lock strips the reactive force is transmitted by the cylinder portion to the body of the drill in a manner tending to force the drill unit away from the template. This reactive force is resisted by the lock-on bushing flanges which are thereby forcibly drawn into engagement with the undersurfaces of the notches so that the drill unit is rigidly supported normal to the lock strips.

Accordingly it is an object of this invention to provide an attachment for a drill that will support the drill, during operation, in a direction normal to a drill jig fixture.

Another object is the provision of a drill attachment which may be quickly and easily applied to an airfeed drill and may be made as stock items in different sizes for application to the different sizes of airfeed drills in normal use.

Still another object is to provide a nose adapter attachment for a drill of the airfeed type that will minimize the development of wear or "slop" in the drill aligning parts and which will allow the drilling of axially aligned holes even though a certain amount of such wear does exist.

Another object of this invention is to provide a nose adapter attachment for a self-holding drill of the air-feed type that will provide sufficient additional support to eliminate angular displacement and canting of the drill holes caused by the weight of the drill and wear of the drill aligning parts.

A still further object is to provide a nose adapter attachment for an airfeed drill that will provide increased accuracy and will eliminate the re-work necessary to make canted holes usable.

These and other objects and advantages of this invention will become apparent to those skilled in the art from the following description taken in conjunction with the accompanying drawings forming a part thereof, in which:

Fig. 1 is a view, partly in section and partly in elevation, of the adapter device of this invention showing it attached to an air-feed drill and coacting with a drill jig in its normal operating position.

Fig. 2 is a view of the lock strips showing the flanged portion of the lock-on bushing in its holding position engaging the undercut surfaces of the lock strips.

Fig. 3 is a simplified showing of an air-feed drill, incorporating the device of this invention, as set up in its normal operating position.

Referring specifically to the drawings, wherein like reference characters have been used throughout the several views to designate like parts, and referring at first to Fig. 3 which shows the complete unit in operating position, reference numeral 1 generally designates the nose adapter attachment of this invention as installed on an air-feed drill unit 2 which has an existing nose portion 3 carrying a lock-on bushing 4. The lock-on bushing comprises a bushing attached to the nose portion 3 and having a pair of oppositely disposed radially extending flanges 9 intermediate the ends of the bushing and a bushing portion 8, through which the drill bit 27 passes, adapted for insertion into the template guide hole 7. Two lock strips 5 having notched-out corners on their nearest adjacent edges are attached to the template 6, one on either side of the guide hole, in parallel spaced-apart relationship in a manner to form a T-slot in conjunction with the template. Flanges 9 may thus be inserted into the slot when parallel to the lock strips and rotated to place the flanges in engagement with the undercut surfaces 10 of the lock strips in a manner to retain drill unit 2 substantially normal to the template. The outer edges of flanges 9 contact the inner edges of the groove and absorb the torque load to prevent rotation of the drill. Simultaneously with entry of the flanges into the T-slot bushing extension 8 will be received into template guide hole 7. Upon completion of the drilling, counter-boring, or countersinking operation the drill unit may be withdrawn by rotating the whole drill unit and attached lock-on bushing so that the flanges 9 lie parallel to the lock strips and can be withdrawn therefrom. This manner of self-holding attachment of an air-feed drill is well known in the art, but it does not meet present day requirements of accurate alignment and reduced wear and maintenance.

The improved arrangement of the present invention, as best shown in Fig. 1, generally comprises a nose adapter 1 for attachment to an existing drill of the Keller air-feed type for applying a force normal to the outer surfaces 11 of lock strips 5. The resultant reactive force is transmitted to the body of the drill unit in a direction parallel to the longitudinal axis of the drill unit. This symmetrically applied reactive force serves to rigidly position the drill unit normal to the lock strip surfaces by forcibly drawing flanges 9 into tight bearing relationship with undercut surfaces 10 on the lock strip. Thus, with the drill unit and jig fixture in proper alignment, obtaining the correct bore angle in the work-piece depends upon proper positioning of the work 28 relative to the parallel lock strips.

More specifically, an annular cylinder 12 is formed concentrically about the drill unit 2 by means of annular L-shaped member 13 and annular member 14 which threadedly engages L-shaped member 13 at 15 at the rearward end of the cylinder. Cylinder 12 contains an annular chamber 16 suitable for reciprocation of an annular piston 19 located therein. A circumferential clearance exists between member 13 and member 14 at the forward end of the chamber forming an annular slot 17 for reception of a reciprocable cylindrical sleeve piston rod 18. Piston 19 and integral piston rod 18 thus form a means for applying a force normal to the locking members 5 of the jig fixture.

Piston 19 has seals 20 and 21 at the inner and outer edges thereof, respectively, of an O-ring or other suitable configuration. Sleeve piston rod 18 is attached to or is integral with piston 19, and both the piston and piston rod are biased to a return position at the rear of chamber 16 by a plurality of springs 22 positioned in a plurality of circumferentially spaced chambers 29 at the forward end of member 14. A port 23 provides access into the rear of the chamber for connection to a source of pressurized air. L-shaped member 13 has an integral annular flange 24 on the inner surface of the side adjacent the body of the drill unit. This flange secures the nose adapter to the existing drill unit when inserted into the groove formed between the threadedly connected drill body 2 and the drill nose portion 3. A separate retaining type locking ring could also be suitably used instead of an integral flange type of connection. The annular closed ended cylinder formed by members 14 and 13 is thus secured to the drill unit through annular flange 24 and together these elements form the means whereby the reactive force of the pressurized fluid, which has been admitted to the chamber 16, is applied to the drill unit.

Cylindrical piston rod 18 extends forwardly concentrically around the drill nose portion and has an internal annular shoulder 25 which slidably contacts the forward portion 30 of the drill nose portion for a limited reciprocal movement, whereby each of the juxtaposed members is mutually guided and supported. The forward portion of the sleeve piston rod terminates in an annular pressure foot or shoulder 26 adapted to bear flush against the lock strips. For ease of installation this pressure foot may be screw-threaded to the forward end of the cylindrical piston rod instead of being integral therewith.

In operation, the lock-on drill bushing is inserted as previously described so as to engage the notched undercut surfaces of the locking strips with bushing extension 8 located within guide aperture 7. Air pressure is then admitted into chamber 16 driving piston 19 forward against the biasing force of springs 22. Piston rod 18 is then extended forwardly until shoulder 26 is in bearing contact with lock strips 5 whereby a force is exerted normal to the lock strips. Since hollow annular cylinder 12 is securely attached to drill unit 2 by flange 24, the reactive force, acting concentrically around the drill unit, is transmitted to the unit in a manner tending to align the drill unit axis parallel to the concentric cylindrical piston rod and exert a force drawing the flanges 9 into engagement with undercut surfaces 10. Since the piston rod acts normal to the surface of the lock strips, the drill unit will also be normal thereto.

Since the nose portion 3 of an airfeed drill of the Keller type is threaded onto extension 33 of the drill unit 2, installation of the adapter unit is easily effected by removing nose portion 3 and then reassembling the drill unit with the nose portion inside of sleeve piston rod 18 and with annular flange 24 located in abutting relation between the adjacent ends of drill body 2 and nose portion 3.

Chamber 16 receives air through a short flexible conduit 32 tapped into the main air supply for the drill unit. Pressure may thus be applied at 11 as each drilling operation is commenced and released upon completion of the return stroke. The drill unit is thus positively held and accurately aligned relative to the drill fixture during each drilling, counterboring or countersinking operation with the lock-on bushing flanges 9 being drawn tightly against surfaces 11.

To allow inspection and to provide access to nose portion 3 and to the drill bit 27, as well as providing a means for removal of metal chips and turnings, sleeve piston 18 may be provided with large ports 31 matching those in the drill nose portion.

While a particular embodiment of this invention has been illustrated and described herein, it will be apparent that various changes and modifications may be made in the construction and the arrangement of the various parts without departing from the spirit and scope of this invention in its broader aspects or as defined in the following claims.

We claim:

1. In combination, a drill template having lock members positioned thereon, a pneumatic rotary air feed drill comprising a cylindrical nose portion and a lock-on type bushing suitable for engaging the lock members on said drill template; annular cylinder means concentrically attached about said drill, pneumatically operable piston means reciprocable in said cylinder means, a cylindrical member integral with said piston means extending outwardly from said cylinder means concentrically about said cylindrical nose portion, and guide means on said cylindrical member for operatively contacting said nose portion for guiding the reciprocal movements thereof; said cylindrical member being adapted to be extended into contact with said lock strips for exerting a force normal thereto whereby the air feed drill may be rigidly positioned normal to the lock strips by the reactive force transmitted to said drill which draws the lock-on bushing into firm operative engagement with said lock strips.

2. In combination, a rotary air-actuated drill comprising a cylindrical body portion having an annular circumferential groove therearound and a lock-on type bushing having shoulder portions adapted for engaging portions of lock strips on a drill template; annular cylinder means concentrically attached about said cylindrical body portion, pneumatically operable annular piston means reciprocable in said cylinder means, a hollow cylindrical piston rod integral with said piston means extending outwardly from said cylinder means concentrically about said cylindrical body portion, cylinder keying means for insertion into said annular groove whereby the annular cylinder means is securely attached to said drill body portion, said piston rod being adapted to be extended into contact with the lock strips for exerting a force normal thereto whereby the air feed drill may be rigidly positioned normal to the lock strips by the reactive force transmitted to the drill through the attached cylinder means which draws the lock-on bushing into firm operative contact with said lock strips.

3. In combination, a pneumatic rotary air-feed drill comprising a body member having a threaded forward portion, a cylindrical nose portion threadedly engaging the forward portion of the body member in a manner to leave a circumferential groove between the opposed ends of the body member and the nose portion, and a lock-on bushing having flange portions adapted for engaging portions of lock strips attached to a drill fixture; an annular cylindrical body having an annular cylindrical chamber therein concentric about a portion of said body member and said nose portion, an annular inwardly extending radial flange integral with said cylinder positioned in said circumferential groove, an annular piston reciprocably mounted in said annular chamber, means for biasing the piston to the rear end of the chamber into an inoperative position, a cylinder integral with said piston extending forwardly from said annular cylindrical body concentrically about said cylindrical nose portion, a guide means on said cylindrical reciprocably contacting a portion of said nose portion for guiding and supporting said cylinder, a shoulder means on the forward end of said cylinder for operatively contacting the lock strips upon forward extension of said piston and integral cylinder, said annular cylindrical body having a port adapted for connecting the chamber to a source of pressurized fluid whereby the piston may be moved forwardly against the biasing means and the integral cylinder extended so that the shoulder means exerts a force normal to the lock strips and rigidly positions the drill normal to the lock strips upon admission of pressurized fluid to said chamber.

4. In combination, a rotary, fluid-actuated drill comprising a cylindrical body portion and a lock-on bushing for engaging lock members on a drill template, a hollow annular cylinder means circumferentially rigidly but removably attached to the cylindrical body portion of said drill at a location intermediate the ends of the drill; a hollow annular piston means having a portion reciprocable within said cylinder means and including a portion circumferentially and slidably contacting said cylindrical body portion at a location in proximity to the chuck end of said drill, said slidable portion including an end portion for forcibly bearing against the drill template lock members upon forward movement of the piston means whereby the drill will be rigidly positioned outwardly normal to the lock members.

5. A nose adapter unit for rigidly positioning an airfeed drill normal to the locking members of a jig fixture to which the drill is secured by means of a lock-on type nose bushing and wherein said drill has annular body portions separable to form a circumferential groove around said drill, said nose adapter unit comprising a hollow annular cylindrical body having an annular cylindrical chamber therein; an annular flange on said annular cylindrical body for reception in the circumferential groove and attachment to the drill; a hollow annular piston reciprocably mounted in said annular chamber; means biasing the piston to one end of the chamber; a hollow cylinder integral with said piston extending outwardly from said hollow annular cylindrical body for concentric positioning about the forward portion of the drill, said hollow cylinder having an end portion for operatively contacting the drill fixture locking members upon forward extension of the piston and integral hollow cylinder, said annular cylindrical body having a port providing communication between the chamber therein and a source of pressurized fluid whereby the piston may be moved forwardly against the biasing means and the integral cylinder moved to a forwardly extended position.

6. A nose adapter unit for rigidly positioning an airfeed drill that is secured generally normal to a drill fixture by means of a lock-on type nose bushing comprising a hollow annular cylinder chamber means for rigid but removable attachment circumferentially about the air feed drill; a hollow annular piston means reciprocable in said chamber means; and means integral with said annular piston means for operatively contacting the drill fixture upon forward movement of said piston means whereby said drill unit may be rigidly positioned outwardly from the drill fixture.

7. A nose adapter unit for rigidly positioning a substantially cylindrical air-feed drill that is secured to the locking members of a jig fixture by means of a lock-on nose bushing comprising a hollow annular cylinder means for rigid but removable concentric attachment about said airfeed drill; a hollow annular piston means reciprocable in said cylinder means; and a hollow cylindrical piston rod means integral with said hollow annular piston means for concentric extension forwardly about the drill, said piston rod means having an end portion for operatively contacting the jig fixture locking members upon forward movement of said piston means and said integral piston rod means whereby the drill unit may be rigidly positioned outwardly from the jig fixture by the reactive force exerted thereon by the nose adapter unit.

8. In combination, a rotary fluid-feed drill having a cylindrical nose portion and a lock-on nose bushing having flanges suitable for engaging slotted locking members on a drill fixture; a hollow member concentrically surrounding the nose end of the drill and longitudinally movable along the drill surface for operatively contacting the locking members; means integral with said concentric member for moving said concentric member forwardly into operative contact with the locking members whereby a force may be applied normal to said locking members, said integral moving means including a reciprocable means that encircles the drill and is longitudinally movable along the drill peripheral surface; and means rigidly securing a portion of said moving means to said drill whereby the reactive force to the force applied normal to said locking members is applied to said drill to forcefully secure the flanges of the lock-on nose bushing and the slotted locking members engaged thereby in abutting contact whereby the drill is positioned rigidly outwardly from said drill fixture.

9. The combination of a rotary air-feed drill having a cylindrical nose portion and a nose bushing having flanges suitable for engaging slotted locking members on a drill fixture; a hollow annular concentric cylinder means rigidly but removably attached to said drill; a hollow cylindrical reciprocable piston means concentrically surrounding the nose end of said drill and having a shoulder portion for operatively contacting the locking members upon forward movement of said piston means to exert a force normal to the fixture with the reactive force being transmitted to said drill by said attached concentric cylindrical means for maintaining the drill normal to said fixture.

References Cited in the file of this patent

UNITED STATES PATENTS

| 2,488,992 | Taylor | Nov. 22, 1949 |
| 2,669,887 | Rees | Feb. 23, 1954 |
| 2,706,917 | Hill | Apr. 26, 1955 |

FOREIGN PATENTS

| 879,749 | France | Nov. 30, 1942 |